(12) United States Patent
Venkatavaradhan et al.

(10) Patent No.: US 9,043,618 B2
(45) Date of Patent: May 26, 2015

(54) DRAWING POWER OVER NETWORK CABLE

(75) Inventors: Devarajan Venkatavaradhan, Karnataka (IN); Periasamy Manikandan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 171 days.

(21) Appl. No.: 13/524,215

(22) Filed: Jun. 15, 2012

(65) Prior Publication Data

US 2012/0324254 A1 Dec. 20, 2012

(30) Foreign Application Priority Data

Jun. 17, 2011 (IN) .............................. 2053/CHE/2011

(51) Int. Cl.
*G06F 1/26* (2006.01)
*H04L 12/10* (2006.01)

(52) U.S. Cl.
CPC ................ *H04L 12/10* (2013.01); *G06F 1/266* (2013.01)

(58) Field of Classification Search
CPC ................................ G06F 1/266; H04L 12/10
USPC ........................................................ 713/300
See application file for complete search history.

(56) References Cited

U.S. PATENT DOCUMENTS

| | | | |
|---|---|---|---|
| 7,664,136 B2 | 2/2010 | Toebes et al. | |
| 7,774,634 B2 * | 8/2010 | Diab | 713/340 |
| 7,814,340 B2 | 10/2010 | Heath et al. | |
| 7,870,401 B2 | 1/2011 | Diab et al. | |

OTHER PUBLICATIONS

Power Over Ethernet (PoE) Power Requirements FAQ (Research Paper) Publication Date: Jun. 26, 2008.
Indian application No. 2053/CHE/2011, filed Jun. 17, 2011 Hewlett-Packard.

* cited by examiner

*Primary Examiner* — Albert Wang

(57) ABSTRACT

A source device to provide power through a network cable and a user device is to draw power from the network cable. A database is to store a parameter associated with the user device. The source device is to access the stored parameter based on receipt of information related to the user device and is to compare at least one of a current power drawn and an additional power requested by the user device to a power limit of the user device based on the accessed parameters. The source device is to send a power message to the user device based on the comparison, the power message to relate to an amount of the power the user device is to draw.

18 Claims, 7 Drawing Sheets

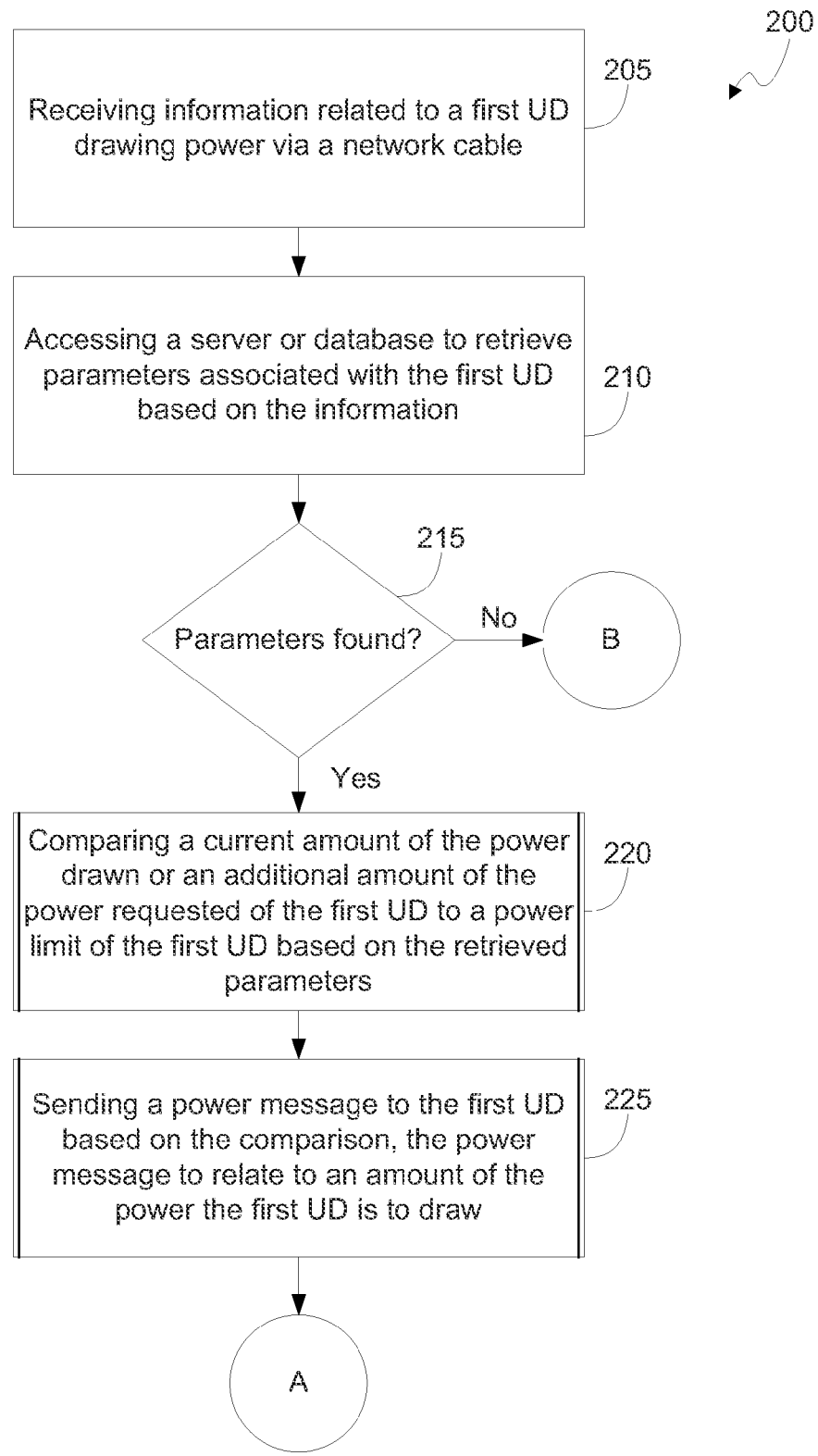

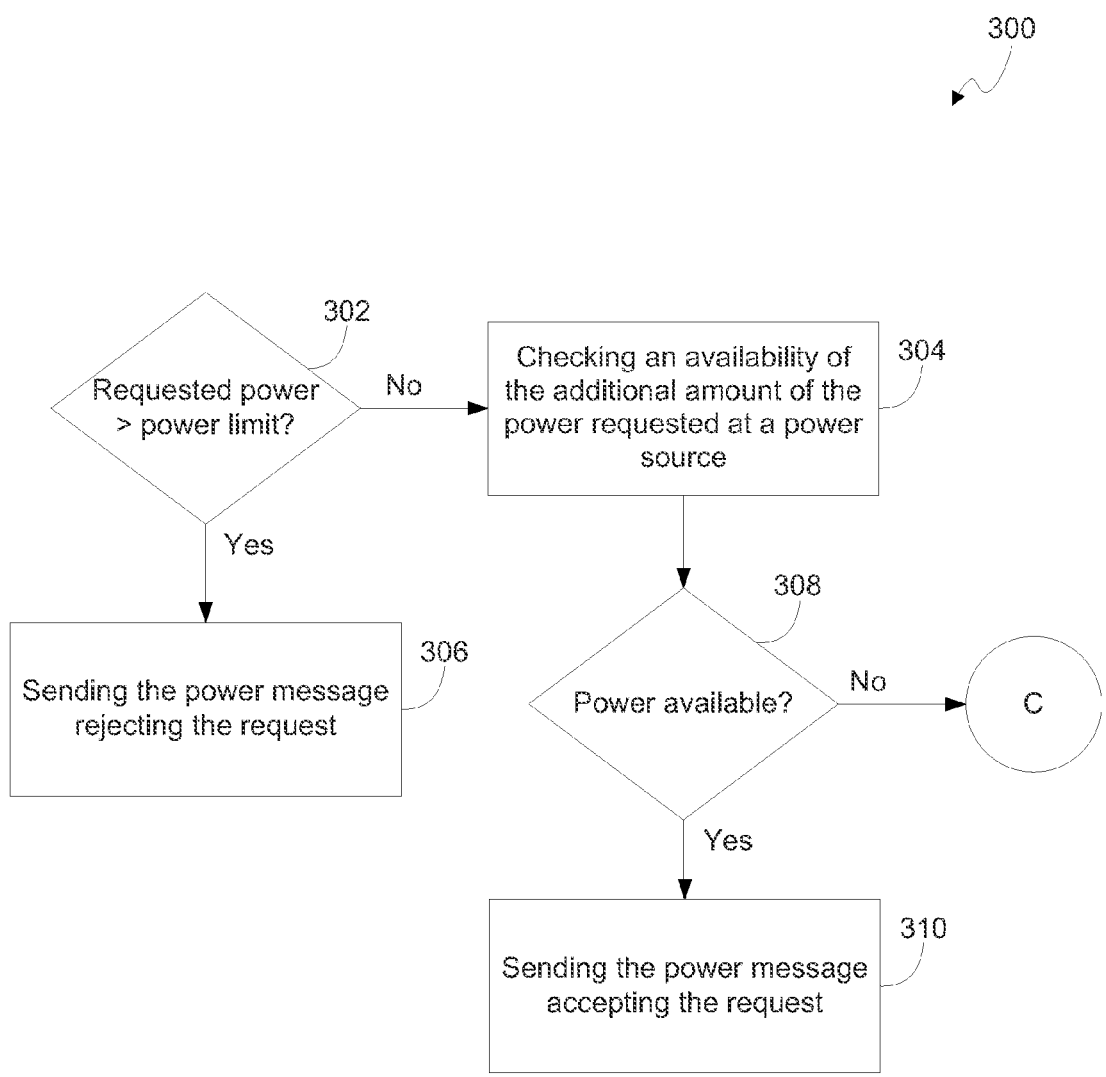

DRAWING POWER OVER NETWORK CABLE

PRIORITY STATEMENT

This U.S. non-provisional application claims priority under 35 U.S.C. §119(e) to Indian application No. 2053/CHE/2011, filed Jun. 17, 2011, in the Indian Patent Office, the entire contents of which are incorporated herein by reference.

BACKGROUND

Power may be delivered to devices over a network data cable, such as an Ethernet data cable, of a network. Manufacturers and/or users of such networks are challenged to provide power to various types of devices and/or for various uses via the network data cable.

BRIEF DESCRIPTION OF THE DRAWINGS

The following detailed description references the drawings, wherein:

FIGS. 2A to 2B is an example flowchart of a method for providing power over a network;

FIGS. 3A to 3C is an example flowchart of a method of blocks 220 and 225 of FIG. 2A for when an additional amount of the power requested.

DETAILED DESCRIPTION

Figure 1:
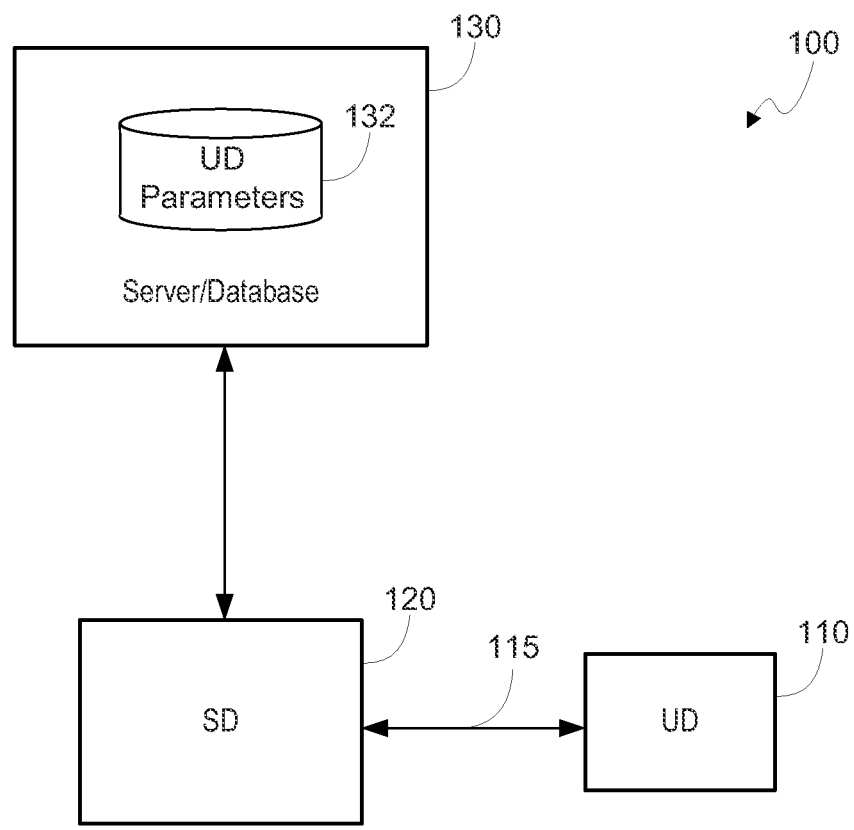
FIG. 1 is an example block diagram of a power network.

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A user device, such as a phone or camera, may be connected to a source device capable of providing power to the user device over a network. For example, the user device may be connected to a port of the source device via a network cable. The network cable may also transmit data in addition to providing power to the user device. In one instance, the user device may transmit parameters to the source device over the network cable and the source device may provide the power to the user device based on the parameters.

However, the user device may require additional power at a later time, such as when the camera starts recording or when the phone turns on its display. At this later time, the user device will send a request to the source device requesting the additional power. The power available to the entire network may be limited and shared among a plurality of user devices. If the additional power is available, the source device may accept the request for the additional power and provide the additional power to the requesting user device.

Yet if the additional power is not available, the source device may deny the additional power to the requesting user device or cut off power to at least one of the other plurality of user devices. The source device may determine which of the user devices to cut power to based on a priority and/or power limit that is hardwired to each physical port of the source device. For example, a user device connected to a port having a lower priority or an exceeded power limit may have its power cut.

However, determining the priorities and/or power limits for each port may require significant planning upfront and/or guessing as to the types of user devices that will be connecting to the ports. Further, if the user device is moved to another port, maintaining the same priority and/or power limit may require a manual reconfiguration at a physical site of the other port. Such initial configuring and later reconfiguring may cause significant overhead.

Moreover, certain source devices and/or ports of sources device may be intended to power only certain types of user devices, such as phones, or power the user devices according to a power schedule, such as only at certain times of the day. Yet the network may lack a capability to provide such type of control to a network administrator.

Embodiments may instead allow parameters, such as the priority, power limit, and power schedule to be assigned based on an identity and/or type of the user device, regardless of the port and/or source device to which the user device is connected. For example, embodiments may include a database to store the parameters for each of the user devices. Any source device in the network may then access the database whenever a user device is connected thereto.

Thus, embodiments may allow/disallow power to the user device based on an identity of the user device, regardless of the port and/or source device to which the user device is connected. In an embodiment, the priority, power limit, and power schedule of the user device may remain the same even when the user device reconnects at a different port and/or source device of the network. In another embodiment, the user device may be denied power if it has exceeded its power limit regardless of which port and/or source device to which the user device connects and/or only be allowed power at certain ports and/or source devices. Further, an embodiment may allow the power to one or more of the user devices to be controlled based on global factors, such as a time of day.

Moreover, embodiments may allow the network administrator to flexibly configure or reconfigure the power settings remotely for one or more of the user devices at any time by updating the database. In addition, embodiments may alert the network administrator or a management station about a status of the user device, such as when the user device is denied power.

Referring now to the drawings, FIG. 1 is an example block diagram of a power network 100. In the embodiment of FIG. 1, the power network 100 includes a first user device (UD) 110, a source device (SD) 120, and a server 130 including a database 132 to store UD parameters. The first UD 110 is to receive power from the SD 120.

A network cable 115, such as an Ethernet cable, may connect the first UD 110, a port (not shown) of the SD 120. When the Ethernet cable is used, the first UD 110 may be referred to as the Powered Device (PD), the SD 120 may be referred to as the Power Sourcing Equipment (PSE) and an overall scheme for providing the power may be referred to as Power over Ethernet (PoE). However, embodiments are not limited to Ethernet cables and may include various other types of network cables.

The first UD 110 may be any type of device to accept and use the power received via the network cable 115. The first UD 110 may also receive data through the same network cable 115, thus reducing costs and/or a number of connections. Examples of the first UD 110 may include Internet Protocol (IP) telephones, wireless access points, cameras, remote switches, embedded computers, thin clients, displays, computing devices, etc. The SD 120 may be any type of device to provide the power on the network cable 115, such as a switch. The SD 120 may be a device that connects any portion of the network 100. The network 100 may include a plurality of computers and/or devices connected via communication channels to share resources, such as the power, and/or information, like the data.

The SD 120 may access a power source (not shown), such as a transformer, to deliver the power from the power source to the network cable 115. For example, the SD 120 may provide 15.4 Watts (W), 30 W, or 60 W, depending on a type of the network cable 115. Further, while only the first UD 110 is shown to interface with the one SD 120, embodiments may include a plurality of UDs interfacing with one or more SDs 120.

The server 130 may further include a processor (not shown) and the database 132 may be a machine-readable storage medium storing the UD parameters. The term machine-readable storage medium may refer to any electronic, magnetic, optical, or other physical storage device that contains or stores data or executable instructions. Thus, the machine-readable storage medium may be, for example, Random Access Memory (RAM), an Electrically Erasable Programmable Read-Only Memory (EEPROM), a storage drive, a Compact Disc Read Only Memory (CD-ROM), and the like.

The processor may be, at least one central processing unit (CPU), at least one semiconductor-based microprocessor, at least one graphics processing unit (GPU), other hardware devices suitable for retrieval of the UD parameters stored in the database 132. While FIG. 1 shows the database 132 to be included in the server 130, embodiments may also include the database 132 to be external to the server 130.

The database 132 is to store one or more parameters associated with the UD 110 and the SD 120 is to access at least one of the stored parameters based on receipt of information related to the first UD 110. The information may be received by the SD 120, for example, from the first UD 110, such as through a Link Layer Discovery Protocol (LLDP) message. The information may include an identifier that uniquely identifies the UD 110, such as an internet protocol (IP) Media Access Control (MAC) or Ethernet Hardware Address (EHA) address, and/or a type that identifies a power requirement of the first UD 110. Different types of UDs 110 may have different power requirements. The parameters may be initialized and/or modified remotely, such as by a network administrator.

The SD 120 may use the information to retrieve one or more parameters associated with the first UD 110 from the database 132. For example, the one or more retrieved parameters may relate to at least one of the type, the identifier, a power limit, a priority, a first UD policy and a power schedule of the first UD 110. The power limit may refer to a maximum allowed power for the first UD 110 and the priority may refer to a level of importance of the first UD 110. The power schedule may refer to a timetable for when power is to be provided to the first UD 110. The first UD policy may refer to various other operations, such as cutting power or generating an alert, based on an identity and/or type of the first UD 110.

The SD 120 may cut or allow the power to the first UD 110 based on one or more of the retrieved parameters. For example, the power schedule of the first UD 110 may be based on a time of day the first UD 110 is to be powered. So depending on the time of day, such as during night, the SD 120 may cut the power the first UD 110.

Next, the SD 120 may compare at least one of a current amount of the power drawn by the UD 110 and an additional amount of the power requested by the UD 110 to the power limit of the first UD 110, based on the accessed parameters.

Then, the SD 120 may send a power message to the first UD 110 based on the comparison, the power message to relate to an amount of the power the first UD 110 is to draw. An operation of the network 100 will be described in further detail below with respect to FIGS. 2A-4.

Figure 2B:
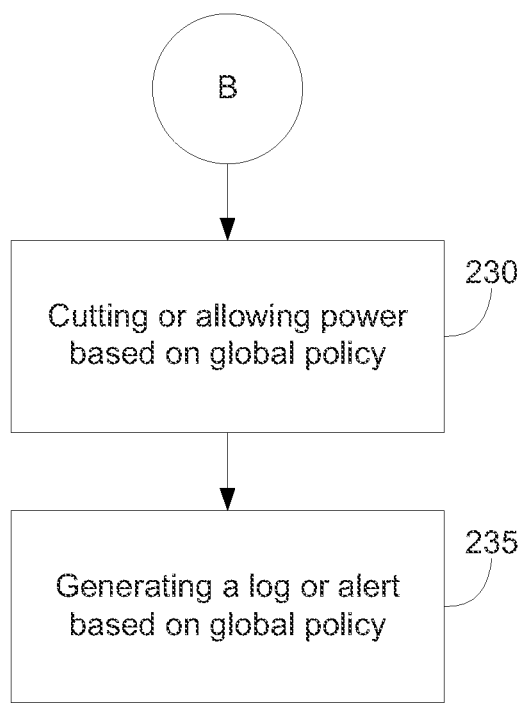

FIGS. 2A to 2C is an example flowchart of a method for providing power over a network. Although execution of method 200 is described below with reference to the power network 100, other suitable networks and/or devices may be also utilized. Additionally, before the method 200 is executed, the following steps may occur beforehand.

Upon connecting the first UD 110 to a port of the SD 120, via a network cable 115, the SD 120 detects a capability of the first UD 110 to receive the power over the network cable 115. For example, the SD 120 may provide a test voltage over one or more pairs of the network cable 115 and detect a resistance at the first UD 110. If the resistance is not within a desired range, the SD 120 detects the first UD 110 as not being capable of receiving power over the network cable. As a result, the SD 120 will not proceed with any other steps related to providing the power to the first UD 110.

Otherwise, the SD 120 may optionally detect a power class of the first UD 110 based on a resistance sensed by the SD 120 at voltages higher than the test voltage. The power class may be a power range for proper operation of the first UD 110, where different power classes may have different power ranges. If the power class is not detected by the SD 120, the first UD 110 may be classified to have a default power class. For example, a default power class may range from 0.44-12.94 W, a first power class may range from 0.44-3.84 W, a second power class may range from 3.84-6.49 W, a third power class may range from 6.49-12.95 W, and a fourth power class may range from 12.95-25.5 W.

Then, the SD 120 may determine an availability of the power at the power source for the first UD 110 based on the detected or default power class. Next, the SD 120 may provide the power to the first UD 110 based on the determined availability of power. For example, the SD 120 may provide the power to the first UD 110 if the power available at the power source is greater than an upper range of the power class of the first UD 110.

Returning to the method 200, assuming the first UD 110 is connected to the SD 120 and currently drawing power, at block 205, the SD 120 receives the information related to the first UD 110 drawing power via the network cable 115. The SD 120 may receive the information from the first UD 110. Then, at block 210, the SD 120 accesses at least one of the server 130 and the database 132 to retrieve one or more parameters associated with the first UD 110 based on the information.

At block 215, if no parameters associated with the first UD 110 are found at the server 130 or database 132, the method 200 proceeds to block 230 as shown in FIG. 2B. Referring to FIG. 2B, the SD 120 refers to a global policy when no parameters specific to the first UD 110 are found at the server 130 or the database 132. The global policy provides default operations and may be stored, for example, as a text file, at the server 130, database 132, or the SD 120. The global policy may be set according to a preference of a user, manufacturer, etc. At block 230, the SD 120 continues to allow the power or cut the power to the first UD 110 based on the global policy.

The global policy may define different default operations for the SD 120 depending on an amount of information known about the first UD 110, such as the type, class, identifier, power limit, priority, power schedule, etc. For example, the global policy may instruct the SD 120 to allow the power where the first UD 110 is of a type telephone but cut the power where the first UD 110 is of a type camera. In another example, the global policy may instruct the SD 120 that all UDs of type telephone may be turned off or have the power limit reduced during non-business hours while UDs of type laptop or security camera may remain powered at all times.

Next, at block 235, the SD 120 generates a log or alert based on the global policy. The generated log or alert may be sent remotely, such as to as an administrator or management station, to indicate that an unidentified UD attempted to draw power and was cut off or allowed. For example, the global policy may only indicate generating the log or alert for certain types of the first UD 110.

Returning to FIG. 2A, if the one or more parameters associated with the first UD 110 are found at the server 130 or database 132, the method 200 proceeds to block 220, where the SD 120 compares if at least one of a current amount of the power drawn by the first UD 110 and an additional amount of the power requested by the first UD 110, to a power limit of the first UD 110 based on one or more of the retrieved parameters. For example, the power limit may be 15 W and the first UD 110 may be currently drawing or requesting 20 W.

As noted above, the power limit may be one of the parameters associated with first 110. In addition, the SD 120 may also perform other operations based on the parameters retrieved. For example, the SD 120 may cut or allow the power to the first UD 110 based on the parameter for the power schedule of the first UD 110, such as cutting power to first UD 110 at night.

Then, at block 225, the SD 120 sends a power message to the first UD 110 based on the comparison, the power message to relate to an amount of the power the first UD 110 is to draw. For example, the power message may include a rejection in response to a request for additional power by the UD 110 or may include a request to draw less of the power, if either the request for additional power or the current drawn power is greater than the power limit. Embodiments of blocks 220 and 225 will be described in further detail with respect to FIGS. 3A-4.

Figure 3B:
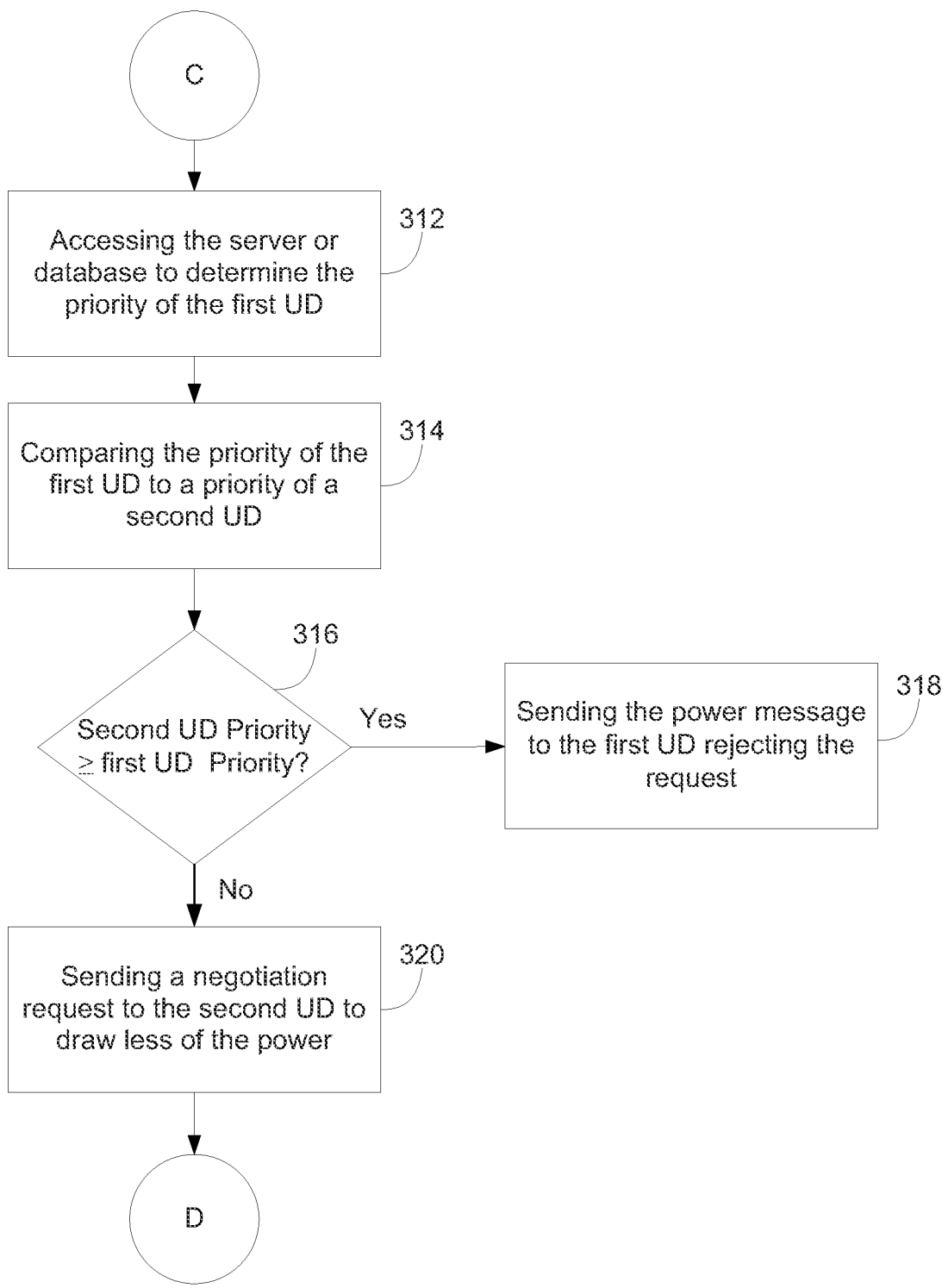
Figure 3C:
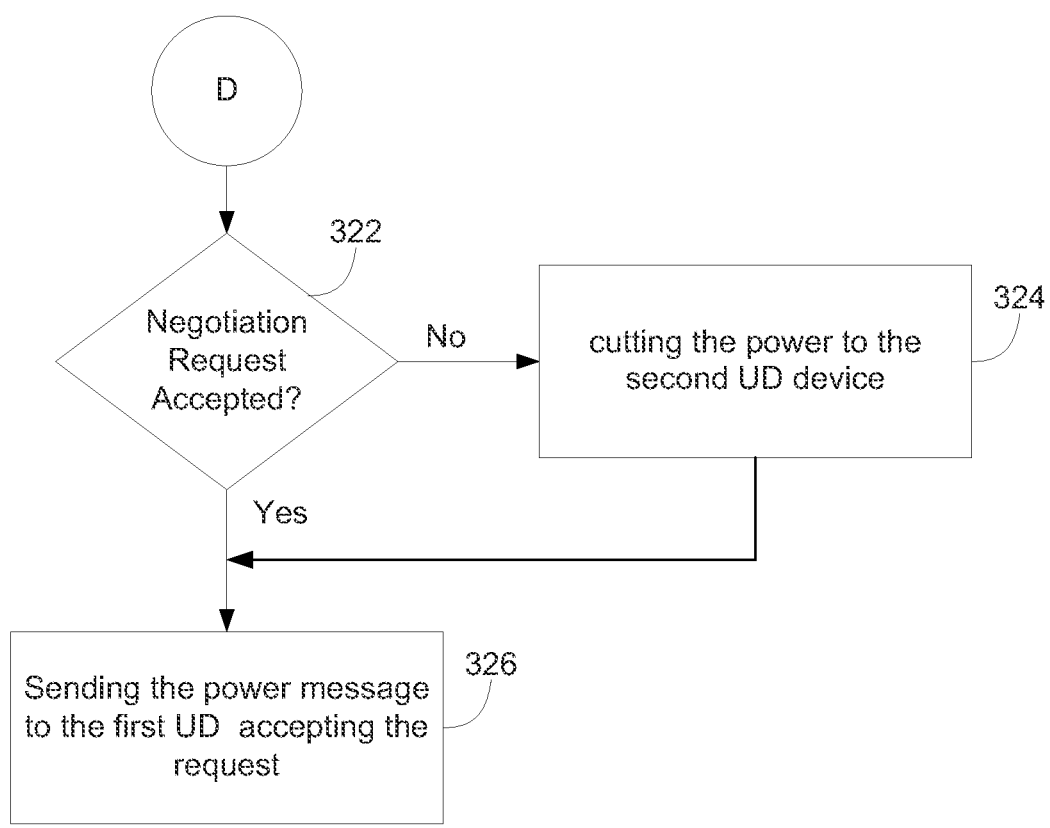

FIGS. 3A to 3C is an example flowchart of a method 300 of blocks 220 and 225 of FIG. 2A for when an additional amount of the power requested. In addition, FIGS. 3A to 3C may include additional one or more blocks between that of blocks 220 and 225. For example, block 302 of FIG. 3A may correspond to block 220 of FIG. 2A and blocks 306, 310, 318 and/or 326 of FIGS. 3A-3B may correspond to block 225 of FIG. 2A while a remainder of the blocks may correspond to additional blocks between that of blocks 220 and 225. In this embodiment, the information received at block 205 of FIG. 2A includes an additional power request for the additional amount of the power for the first UD 110 and the power message at block 225 of FIG. 2A includes a rejection or acceptance of the additional power request, as explained in more detail below.

In FIG. 3A, at block 302, the SD 120, compares the additional requested power to the power limit. For example, the UD 110 may be currently receiving 20 W but requesting 25 W. As explained above, the SD 120 may have previously retrieved the power limit as a parameter from the database 132 or server 130. If the additional power request is greater than the power limit, the SD 120 sends the power message to the UD 110 including a rejection of the additional power request, at block 306.

Otherwise, if the additional power request is still less than or equal to the power limit, the SD 120 checks an availability of the additional amount of the power requested at the power source, at block 304 and then proceeds to block 308. If the additional amount of the power requested is available, the UD 120 sends the power message to the UD 110 including an acceptance of the additional power request, at block 310. Otherwise, the method 200 flows to block 312 of FIG. 3B, where the SD 120 accesses at least one of the server 130 and the database 132 to determine a priority of the first UD 110.

Alternatively, the method 200 may exclude block 312 and instead retrieve the priority of the first UD 110 during the accessing at block 210. Then, at block 314, the SD 120 compares the priority of the first UD 110 to a priority of a second UD (not shown) drawing power from the power source via a network cable connected to the SD 120 or another SD. The second UD may interact similarly within the network 100 to the first UD 110. The priority of the second UD may, for example, be retrieved from the second UD, the server 130 or the database 132.

Further, while the method 200 only includes comparing the priority of the first UD 110 to the second UD, embodiments may include the comparing priorities of more than two UDs. For example, embodiments may include a plurality of the second UDs connected to a plurality of different ports of the SD 120. The priority of a UD may refer to its level of importance with a higher priority indicating a greater level of importance.

Next, at block 316, if the second UD's priority is greater than or equal to the first UD's 110 priority, then the SD 120 sends the power message to the first UD 110 including a rejection of the additional power request, at block 318. Otherwise, if the second UD's priority is less than the first UD's 110 priority, then the SD 120 sends a negotiation request to the second UD to draw less of the power at block 320. The method 200 then flows to block 322 at FIG. 3C to determine whether the negotiation request is accepted. If the second UD accepts the negotiation request, such as via a reply message to the SD 120, then the SD 120 sends the power message to the first UD 110 including an acceptance of the additional power request, at block 326. Thus, at least some of the power is transferred from the second UD to the first UD 110.

If the second UD does not accept the negotiation request, then the SD 120 first cuts the power to the second UD at block 324. Then, the SD 120 flows to block 326, to send the power message to the first UD 110 including an acceptance of the additional power request.

In embodiments which include a plurality of the second UDs, a plurality of the priorities of the second UDs may be compared to the priority of the first UD 110. In this case, at least some of the power may be transferred from a plurality of the second UDs to the first UD 110, where the second UDs having the lower priorities are more likely to receive negotiation requests.

Figure 4:
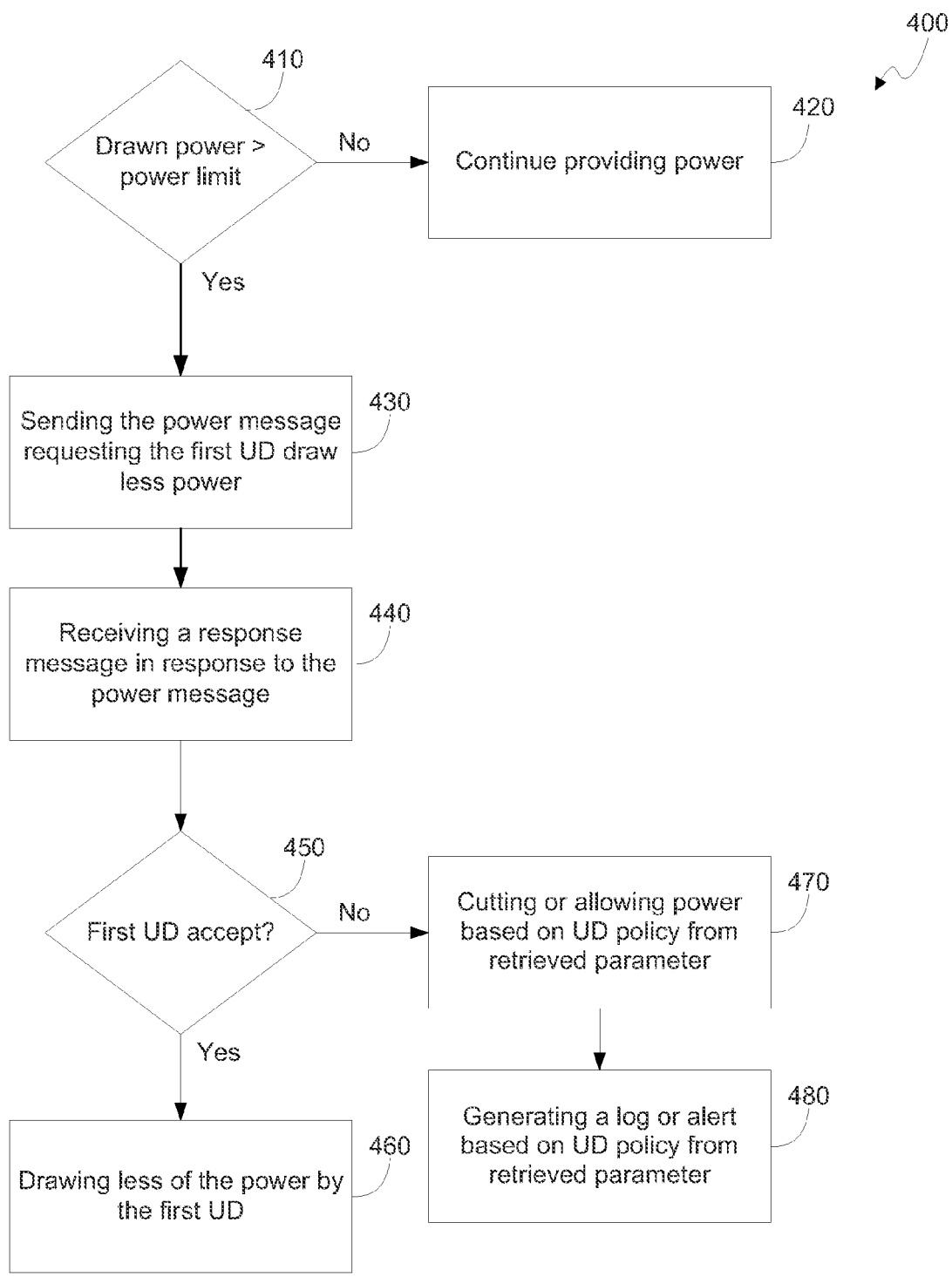
FIG. 4 is an example flowchart of a method of blocks 220 and 225 of FIG. 2A for when a current amount of the power drawn is checked.

FIG. 4 is an example flowchart of a method 400 of steps 220 and 225 of FIG. 2A for when a current amount of the power drawn is checked. In addition, FIG. 4 may include an additional one or more blocks between that of blocks 220 and 225. For example, block 410 of FIG. 4 may correspond to block 220 of FIG. 2A and block 430 may correspond to block 225 of FIG. 2A. Further, block 225 of FIG. 2A may be omitted, if the method 400 flows to block 420. A remainder of the blocks may correspond to additional blocks between or after that of blocks 220 and 225. In this embodiment, the information received at block 205 of FIG. 2A includes the current drawn power by the first UD 110 and the power message at block 225 of FIG. 2A includes a power reduction request for the first UD 110 to draw less of the power, as explained in more detail below.

In FIG. 4, at block 410, the SD 120, compares the current drawn power by the first UD 110 to the power limit. For example, the first UD 110 may be currently receiving 30 W but should only be allowed 25 W according the power limit for the first UD 110. If the drawn power is still less than or equal to the power limit, the SD 120 continues providing power to the first UD 110, at block 420. Otherwise, if the drawn power is greater than the power limit, the SD 120 sends the power message to the UD 110 including the power reduction request for the first UD 110 to draw less of the power, at block 430. Then, at block 440, the SD 120 receives a response message from the first UD 110 in response to the power message. At block 450, the SD 120 determines whether the response message indicates an acceptance or rejection by the first UD 110 of the power reduction request. If the response message indicates the acceptance, then this indicates first UD 110 has agreed to draw less of the power so as to be below the power limit, at block 460.

However, if the response message indicates the rejection, then this indicates first UD 110 has not agreed to draw less of the power and is not below or equal to the power limit. If the first UD 110 does not accept the negotiation request, then the SD 120 first either cuts or allows the power to the first UD 110 at block 470 based on the policy of the first UD 110, at block 470. As noted above, the policy may be retrieved from the database 132 by the SD 120. In addition, the policy of the first UD 110 may be based on one or more of the retrieved parameters, such as the type and/or priority of the device. Next, the SD 120 generates a log or an alert based on the policy of the first UD 110, such as a trap, at block 480. For example, the policy of the first UD 110 may indicate that the SD 120 is to generate and transmit an exception or fault to a network administrator if the power is cut to the first UD 110.

With the above approaches, parameters, such as the priority, power limit, and power schedule may be assigned based on an identity and/or type of the user device, regardless of the port and/or source device to which the user device is connected. As the parameters are stored in a database, the parameters may also be initialed and/or changed readily and remotely, without any physical interaction with the ports and/or source devices.

What is claimed is:

1. A method for providing power over a network, comprising:
   receiving, at a source device, information related to a device drawing power via a network cable, the information including an additional power request for an additional amount of power for the device;
   accessing, by the source device, at least one of a server and a database to retrieve a parameter associated with the device based on the information;
   comparing, at the source device, a current amount of the power drawn by the device and the additional amount of the power requested by the device, to a power limit of the device based on the retrieved parameter; and
   sending, at the source device, a power message to the device based on the comparison, the power message to relate to an amount of the power the device is to draw and to include a rejection of the request for the additional amount of power if the comparing determines the requested power with the current drawn power to be greater than the power limit.

2. The method of claim 1, wherein,
   the information includes the drawn power; and
   the power message includes a power reduction request for the device to draw less of the power if the comparing determines the drawn power to be greater than the power limit.

3. The method of claim 2, further comprising:
   receiving a response message, at the source device, in response to the power message, the response message to indicate one of an acceptance and rejection by the device of the power reduction request;
   at least one of cutting and allowing the power to the device based on the retrieved parameter, by the source device, if the response message indicates the rejection; and
   drawing less of the power by the device if the response message indicates the acceptance.

4. The method of claim 2, further comprising:
   generating at least one of a log and an alert based on the retrieved parameter when the source device at least one of cuts and allows the power, wherein
   the information related to the device is received from the device.

5. The method of claim 1, further comprising:
   checking, by the source device, an availability of the additional amount of the power requested at a power source, if the comparing determines the requested power to be less than or equal to the power limit, wherein
   the power message includes an acceptance of the request only if the checking determines the additional amount of the power requested to be available.

6. The method of claim 5, further comprising:
   comparing, by the source device, a priority of the device to a priority of a second device drawing power from the power source via network cables, if the checking determines the additional amount of the power requested is not available.

7. The method of claim 6, further comprising:
   sending a negotiation request, by the source device, to the second device to draw less of the power if the priority of the second device is lower than that of the device, wherein
   the power message includes an acceptance of the additional power request if the second device accepts the sent negotiation request.

8. The method of claim 7, further comprising:
   cutting the power to the second device if the second device rejects the sent negotiation request, wherein
   the power message includes an acceptance of the additional power request after the cutting the power to the second device.

9. The method of claim 6, further comprising:
   accessing, by the source device, at least one of the server and the database to determine the priority of the device, before the comparing the priority.

10. The method of claim 6, wherein the accessing includes retrieving the priority of the device.

11. The method of claim 1, wherein the retrieved parameter relates to at least one of a type, identifier, maximum allowed power, priority, policy and power schedule of the device.

12. The method of claim 11, further comprising:
    at least one of cutting and allowing the power to the device based on the retrieved parameter, wherein
    the power schedule of the device is based on a time of day the device is to be powered.

13. The method of claim 1, further comprising:
    cutting the power to the device if the accessing cannot retrieve the parameter associated with the device based on a global parameter, and
    generating at least one of a log and an alert based on the retrieved parameter when the source device cuts the power based on a global parameter, wherein
    the receiving receives the information from the device.

14. A power network, comprising:

a source device to provide power through a network cable, wherein the source device to receive information including an additional power request for an additional amount of power for a device, the source device is to compare a current amount of power drawn by the device and the additional amount of power requested for the device to a power limit of the device based on a parameter, and the source device is to send a power message to the device based on the comparison, the power message to relate to an amount of the power the device is to draw and to include a resection of the additional power request if the requested power with current drawn power is greater than the power limit.

15. The power network of claim 14, further comprising:

a database to store the parameter associated with the device, the source device to access the stored parameter based on receipt of information related to the device, wherein the device to draw power from the network cable.

16. The power network of claim 14, wherein, the source device is to check for an availability of the additional amount of the power requested at a power source, if the requested power is less than or equal to the power limit, the source device is to compare a priority of the device to a priority of a second device drawing power from the power source via network cables, if the additional amount of the power requested is not available, and the power message includes an acceptance of the request if the additional amount of the power requested is available.

17. The power network of claim 16, further comprising:

the source device is to send a negotiation request to the second device to draw less of the power if the priority of the second device is lower than that of the device, and the power message includes an acceptance of the additional power request if the second device accepts the sent negotiation request.

18. The power network of claim 14, wherein, the parameter relates to at least one of a type, identifier, maximum allowed power, priority, policy and power schedule of the device, the source device is to at least one of cut and allow the power to the device based on the parameter, and the power schedule of the device is based on a time of day the device is to be powered.

* * * * *

UNITED STATES PATENT AND TRADEMARK OFFICE
CERTIFICATE OF CORRECTION

| | | |
|---|---|---|
| PATENT NO. | : 9,043,618 B2 | Page 1 of 1 |
| APPLICATION NO. | : 13/524215 | |
| DATED | : May 26, 2015 | |
| INVENTOR(S) | : Devarajan Venkatavaradhan et al. | |

It is certified that error appears in the above-identified patent and that said Letters Patent is hereby corrected as shown below:

In the Claims

In column 9, line 13, in Claim 14, delete "resection" and insert -- rejection --, therefor.

Signed and Sealed this
Twenty-ninth Day of September, 2015

Michelle K. Lee
*Director of the United States Patent and Trademark Office*